United States Patent
Hsueh

(10) Patent No.: US 8,813,930 B2
(45) Date of Patent: Aug. 26, 2014

(54) ONE-WAY CLUTCH

(75) Inventor: Li-Yu Hsueh, Taipei (TW)

(73) Assignee: Needle Roller Bearing Co., Ltd., Yangmei, Taoyuan County (TW)

( * ) Notice: Subject to any disclaimer, the term of this patent is extended or adjusted under 35 U.S.C. 154(b) by 234 days.

(21) Appl. No.: 13/274,750

(22) Filed: Oct. 17, 2011

(65) Prior Publication Data

US 2013/0092493 A1  Apr. 18, 2013

(51) Int. Cl.
*F16D 41/067* (2006.01)

(52) U.S. Cl.
CPC .................................. *F16D 41/067* (2013.01)
USPC .................................. 192/45.006; 192/110 B

(58) Field of Classification Search
CPC .............................................. F16D 2041/0601
USPC ............... 192/45.006, 45.01, 45.004, 45.005, 192/45.012
See application file for complete search history.

(56) References Cited

U.S. PATENT DOCUMENTS 2,140,737 A * 12/1938 Dickens .......................... 192/27
2,292,988 A *  8/1942 Bloomfield et al. ..... 192/45.006
3,990,555 A * 11/1976 Carullo ..................... 192/45.006
5,024,308 A *  6/1991 Kinoshita et al. ........... 192/41 A
5,662,197 A *  9/1997 Tabe ......................... 192/45.008
7,040,440 B2 *  5/2006 Kurita et al. ................ 180/206.5
2002/0005325 A1*  1/2002 Yamada .......................... 192/38
2006/0210208 A1*  9/2006 Ota et al. ....................... 384/527

* cited by examiner

*Primary Examiner* — Rodney H Bonck
(74) *Attorney, Agent, or Firm* — Muncy, Geissler, Olds & Lowe, P.C.

(57) ABSTRACT

A one-way clutch includes multiple rollers, a first collar and a second collar that are concentric and rotate relatively to each other, and a circular holding frame. The first collar has multiple cavities each having an inclined bottom surface. The circular holding frame has multiple slots corresponding to the rollers and exposing the cavities. The second collar is rotated to drive the circular holding frame rotating through friction force so that each roller is pushed to contact a higher portion of the inclined bottom surface and also the second collar drives the first collar rotating via pushing of the rollers. When rotational speed of the first collar is greater than that of the second collar, each roller enters a lower portion of the inclined bottom surface and separates from the second collar without transmitting torsional force between the second collar and first collar.

9 Claims, 9 Drawing Sheets

ONE-WAY CLUTCH

FIELD OF THE INVENTION

The present invention relates to a one-way clutch and particularly to a structure of a one-way clutch.

BACKGROUND OF THE INVENTION

Please refer to FIGS. 1 and 2, a conventional one-way clutch includes a first collar 1, a second collar 2, a circular holding frame 3, a plurality of rollers 4 and a plurality of elastic elements 5 at a number corresponding to the rollers 4. The first collar 1 and the second collar 2 are concentric and rotate relatively to each other. The first collar 1 may be held inside the second collar 2, and has a plurality of cavities 6 at a number corresponding to the rollers 4. The circular holding frame 3 is located between the first collar 1 and second collar 2 and fixedly located on the first collar 1, and also has a plurality of slots 7 at a number corresponding to the rollers 4 and exposing the cavities 6. Each cavity 6 has an inclined bottom surface 8 with a lower portion spaced from the second collar 2 at a distance greater than the diameter of the roller 4, and a higher portion spaced from the second collar 2 at a distance smaller than the diameter of the roller 4.

One roller 4 is held in the slot 7 and also the cavity 6. The elastic elements 5 press the side walls of the slots 7 to push the rollers 4 to contact with the higher portions of the inclined bottom surfaces 8.

By means of the aforesaid construction, the second collar 2 can be rotated against the first collar 1 towards the higher portions of the inclined bottom surfaces 8. As the rollers 4 are in contact with the higher portions of the inclined bottom surfaces 8, they also are in contact with the second collar 2 and first collar 1 at the same time. Hence the rollers 4 can serve as transmission medium to allow the second collar 2 to drive the first collar 1 rotating.

When the rotational speed of the first collar 1 is greater than that of the second collar 2, it drives the rollers 4 to contact with the lower portions of the inclined bottom surfaces 8 (as shown in FIG. 2), and then the rollers 4 can be separated from the second collar 2, so that torsional force cannot be transmitted between the second collar 2 and first collar 1.

FIG. 3 illustrates another conventional one-way clutch structure which has a first collar 1A located outside a second collar 2A, namely the first collar 1A and second collar 2A can be switched at different positions. This provides another equivalent structure as mentioned above and also can provide same transmission effect.

The conventional transmission structure requires the elastic elements 5 be positioned transversely, hence a greater amount of space is occupied that limits the number of the rollers 4 that can be deployed. In other words, when the second collar 2 rotates, the number of the rollers 4 serving as the transmission medium is limited, and the torsional force transmitted to the first collar 1 also is limited, hence such a structure is not adaptable to the condition that a greater torsional force is required for transmission.

Moreover, during assembly of the conventional structure the elastic elements 5 must be compressed, and incidental dropping of the elastic elements 5 could happen. Assembly is more difficult and requires more skillful workers equipped with special tools. All this makes production cost higher.

SUMMARY OF THE INVENTION

Therefore, the primary object of the present invention is to provide a one-way clutch to enhance torsional force for transmission.

To achieve the foregoing object, the one-way clutch according to the invention includes a plurality of rollers, a first collar, a second collar and a circular holding frame. The first collar and second collar are concentric and rotate relatively to each other. The first collar has a plurality of cavities at a number corresponding to the rollers. Each cavity has an inclined bottom surface with a lower portion spaced from the second collar at a distance greater than the diameter of the roller and a higher portion spaced from the second collar at a distance smaller than the diameter of the roller.

The circular holding frame is located between the first collar and second collar and is tightly in contact with the second collar, thus a friction force is formed between them to drive the circular holding frame rotating. The circular holding frame has a plurality of slots at a number corresponding to the rollers and exposing the cavities. One roller is held in the slot and also the cavity.

The second collar can be rotated relative to the first collar towards the higher portions of the inclined bottom surfaces, and also drive the circular holding frame rotating due to the friction force to push the rollers to contact with the higher portions of the inclined bottom surfaces. Therefore, the rollers are in contact with the second collar and first collar at the same time to serve as transmission medium to allow the second collar to drive the first collar rotating. Namely, a torsional force is transmitted from the second collar to the first collar. When the rotational speed of the first collar is greater than that of the second collar, the rollers enter the lower portions of the inclined bottom surfaces and separate from the second collar. Namely, when the rotational speed of the first collar is greater than that of the second collar, the torsional force cannot be transmitted between the second and first collars.

Moreover, because the second collar is tightly in contact with the circular holding frame, the friction force generated between them can drive the circular holding frame rotating. Such a design allows the second collar and circular holding frame should be respectively fabricated at precise dimensions. The circular holding frame also has an opening so that a small dimensional tolerance is allowed between the circular holding frame and second collar to further allow the circular holding frame to couple with the second collar at an elastic deformation range. Through the elasticity of the circular holding frame and dimensional tolerance with the second collar, tight contact can be maintained between the second collar and circular holding frame, thus the circular holding frame can be driven to rotate through the friction force between them.

By means of the technique set forth above, the invention does not need the structure of transverse elastic elements, thus can spare more space to accommodate more rollers to enhance the torsional force for transmission. The trouble of installing the elastic elements can also be averted. The invention also provides a simple fabrication process to keep the second collar tightly in contact with the circular holding frame and prevent fabrication tolerance from generating between the second collar and circular holding frame to cause insufficient friction force that could result in inaccurate movements of the one-way clutch.

The foregoing, as well as additional objects, features and advantages of the invention will be more readily apparent from the following embodiments and detailed description, which proceed with reference to the accompanying drawings. The embodiments serve merely for illustrative purpose and are not the limitation of the invention.

DETAILED DESCRIPTION OF THE PREFERRED EMBODIMENTS

Figure 1:
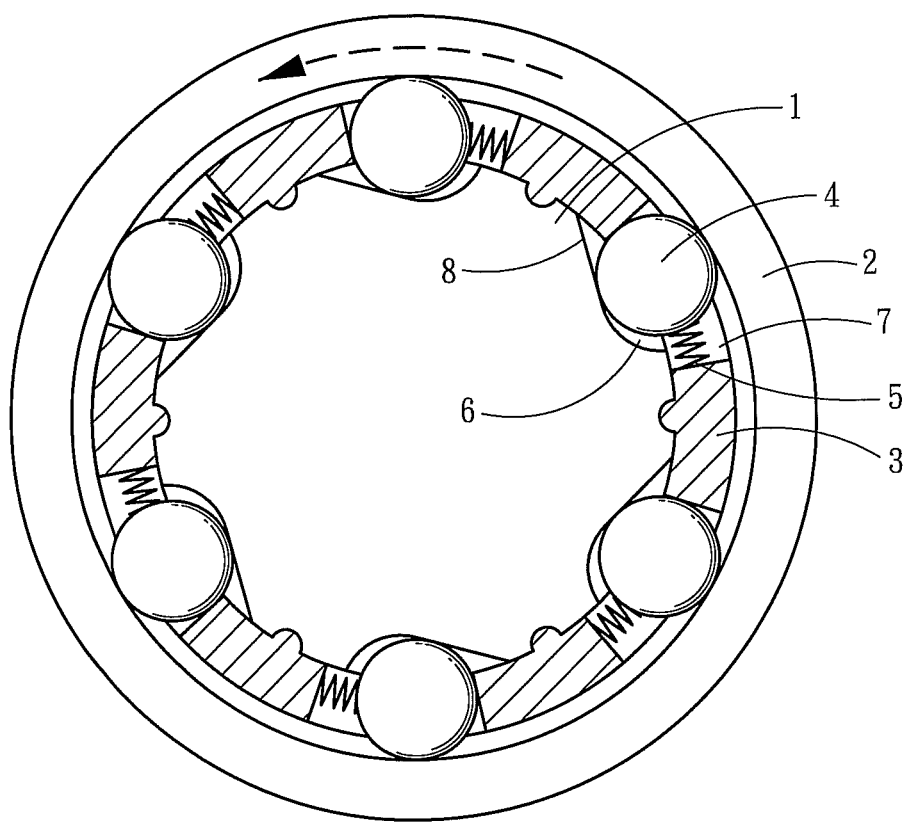
FIG. 1 is a cross section of a conventional one-way clutch.
Figure 2:
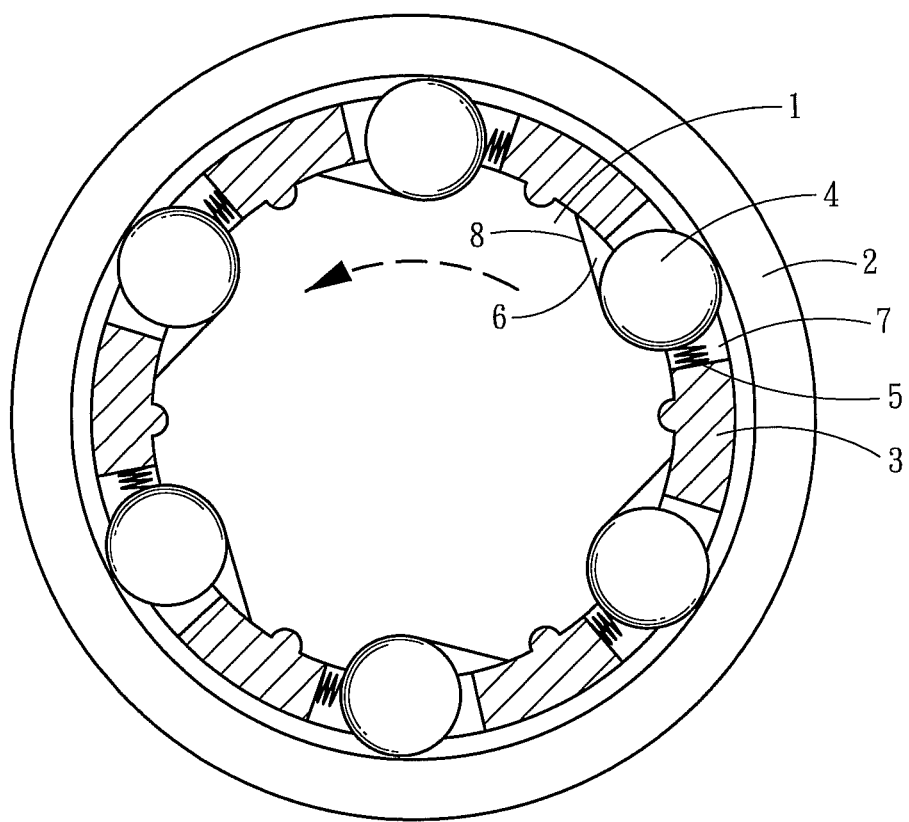
FIG. 2 is a schematic view of a conventional one-way clutch in an operating condition.
Figure 3:
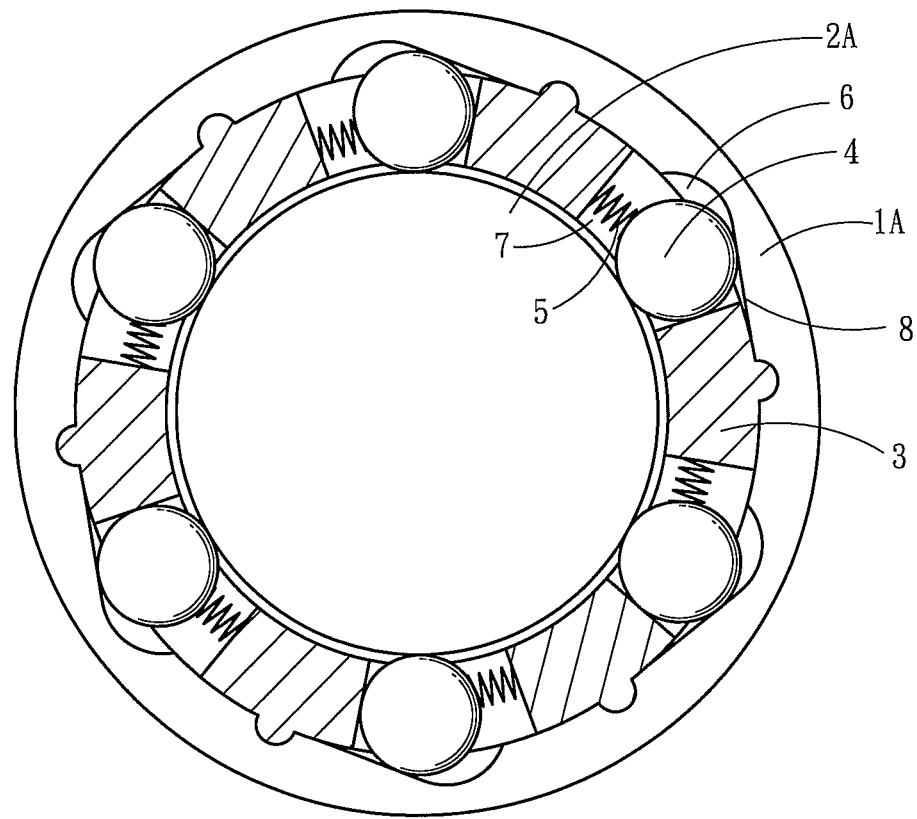
FIG. 3 is a cross section of another conventional one-way clutch.
Figure 4:
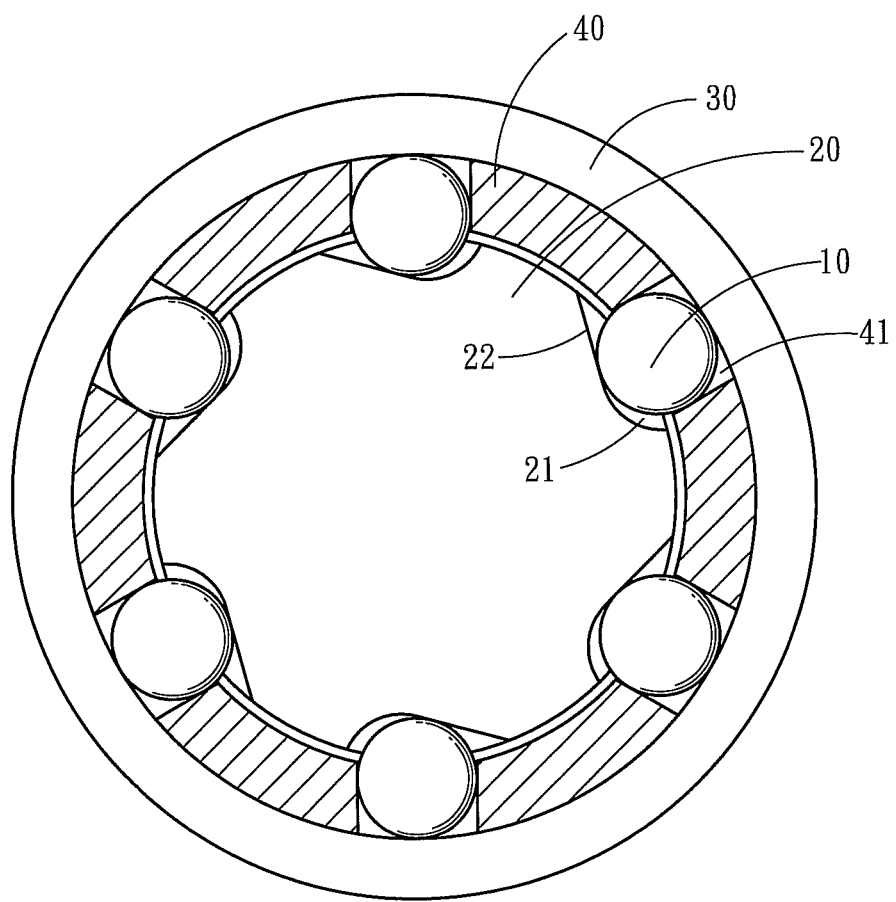
FIG. 4 is a cross section of an embodiment of a one-way clutch of the invention.
Figure 5:
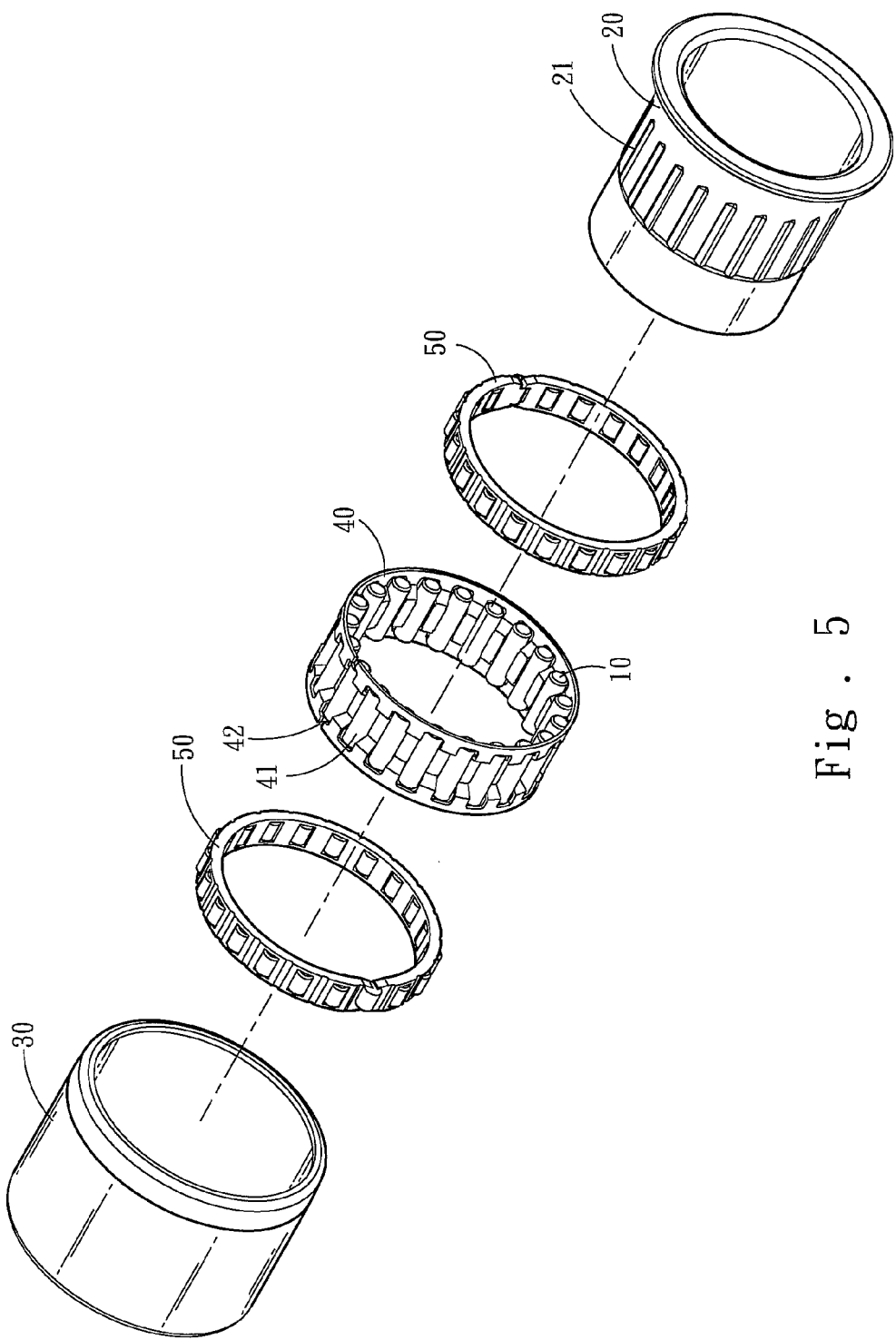
FIG. 5 is an exploded view of the one-way clutch of the invention.

Please refer to FIGS. 4 and 5, the one-way clutch according to the invention includes a plurality of rollers 10, a first collar 20, a second collar 30 and a circular holding frame 40. The first collar 20 and second collar 30 are concentric and rotate relatively to each other. The first collar 20 and second collar 30 also may be interposed by at least one roller bearing 50, preferably at a number of one or two sets. The first collar 20 is held inside the second collar 30 and has a plurality of cavities 21 at a number corresponding to the rollers 10. Each cavity 21 has an inclined bottom surface 22 with a lower portion spaced from the second collar 30 at a distance greater than the diameter of the roller 10, and a higher portion spaced from the second collar 30 at a distance smaller than the diameter of the roller 10.

The circular holding frame 40 is located between the first and second collars 20 and 30 and is tightly in contact with the second collar 30, thus a friction force is formed between them to drive the circular holding frame 40 rotating.

The circular holding frame 40 and second collar 30 form a contact surface between them that contains an abrasion-resistant material. In the event that the circular holding frame 40 is made of metal, the abrasion-resistant material is a coating layer selectively formed by polyaryletherketone (PAEK) or polytetrafluoroethylene (PTFE) and including at least one additive which may be selected from graphite, molybdenum disulfide, PAEK, PTFE, and combinations thereof. In the event that the coating layer is made of PAEK, the additive can be graphite, molybdenum disulfide, PTFE or combinations thereof. When the coating layer is made of PTFE, the additive can be graphite, molybdenum disulfide, PAEK or combinations thereof. The circular holding frame 40 may also be made of plastics doped with at least one additive to enhance abrasion resistance. Similarly, the additive can be selected from the group consisting of graphite, molybdenum disulfide, PAEK, PTFE and combinations thereof. The abrasion-resistant material aims to provide a sliding interface with a desired force friction without wearing off easily.

The circular holding frame 40 further has a plurality of slots 41 at a number corresponding to the rollers 10 and exposing the cavities 21. One roller 10 is held in the slot 41 and also the cavity 21.

Figure 6:
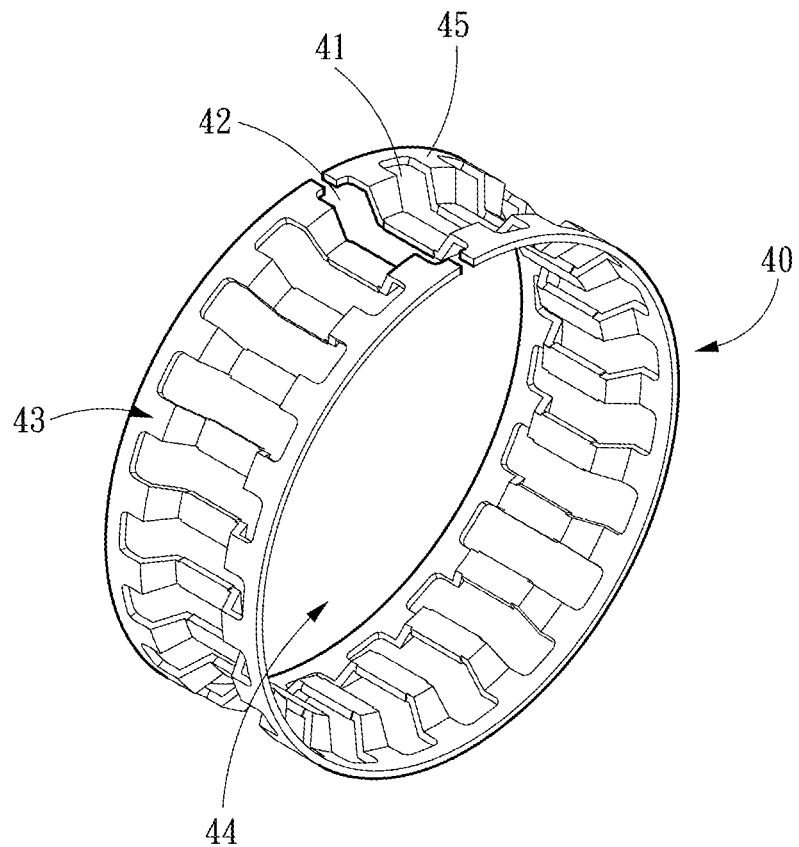
FIG. 6 is a perspective view of a circular holding frame of the invention.

Also referring to FIG. 6, in order to keep the second collar 30 tightly in contact with the circular holding frame 40 and also provide the friction force to drive the circular holding frame 40 rotating, the dimensions of the second collar 30 and circular holding frame 40 must be precisely controlled. The circular holding frame includes a support ring 43 and a holding space 44 formed within the support ring 43. The support ring 43 includes an annular carrying portion 45, a plurality of slots 41 formed on the carrying portion 45 and corresponding to the cavities 21 to hold the rollers 10, respectively (FIG. 4).

In addition, the circular holding frame 40 may have an opening 42 so that the dimension of the circular holding frame 40 can be changed slightly, and also a small dimensional tolerance can be maintained between the circular holding frame 40 and second collar 30 before assembly. Thus during assembly, the dimension of the circular holding frame 40 can be altered within the elastic deformation range to collaborate with the dimensional tolerance with the second collar 30 to form the tight contact between the second collar 30 and circular holding frame 40, thereby the circular holding frame 40 is driven to rotate via the friction force.

Figure 7:
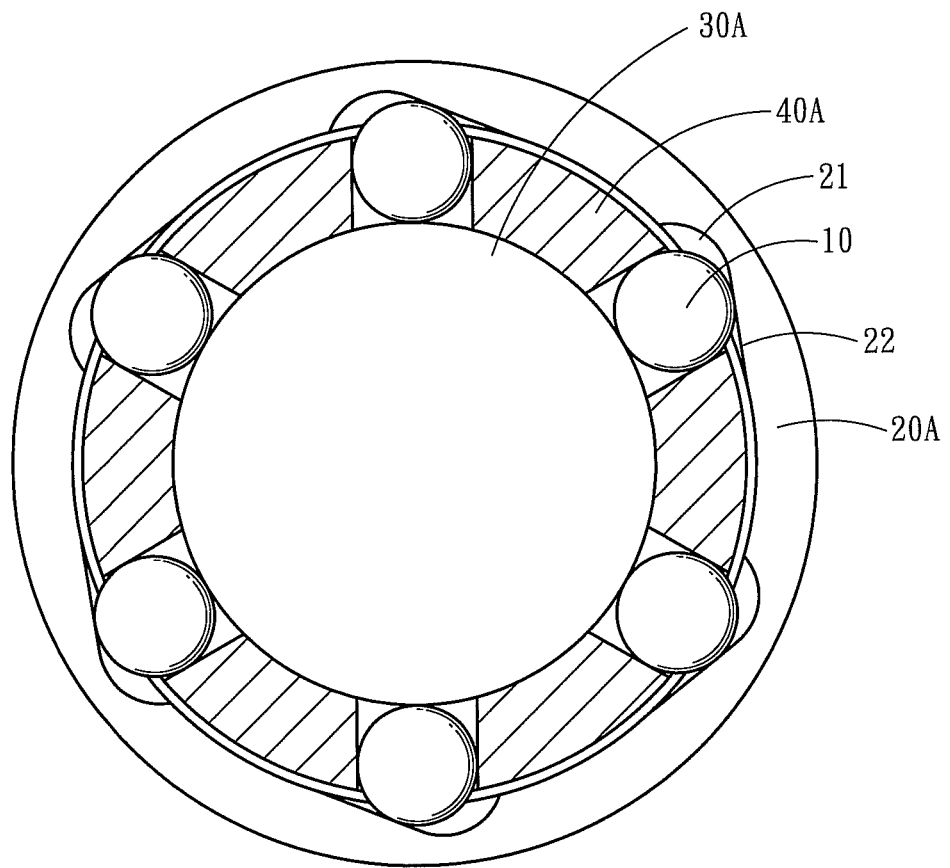
FIG. 7 is a cross section of another embodiment of the one-way clutch of the invention.

Please refer to FIG. 7 for another embodiment that can provide equivalent effect as previously discussed. A first collar 20A is coupled on the outer side of a second collar 30A, and a circular holding frame 40A has an inner diameter to tightly contact with the outer diameter of the second collar 30A. The second collar 30A can drive the circular holding frame 40A rotating through a friction force.

The present invention also provides two embodiments of fabrication method for the two different structures set forth above. In the first embodiment, when the first collar 20 is held inside the second collar 30, the circular holding frame 40 has an outer diameter slightly greater than the inner diameter of the second collar 30 before assembly; during assembly, the circular holding frame 40 is shrunk to a smaller dimension to be squeezed into the second collar 30; then the circular holding frame 40 is expanded through elasticity to tightly contact with the second collar 30.

In the second embodiment, the first collar 20A is coupled on the outer side of the second collar 30A, and the circular holding frame 40A is formed at an inner diameter slightly smaller than the outer diameter of the second collar 30A before assembly. During assembly, the circular holding frame 40A is expanded to a greater dimension to be coupled on the outer side of the second collar 30A, and then the circular holding frame 40A shrinks elastically to tightly contact with the second collar 30A.

Figure 8:
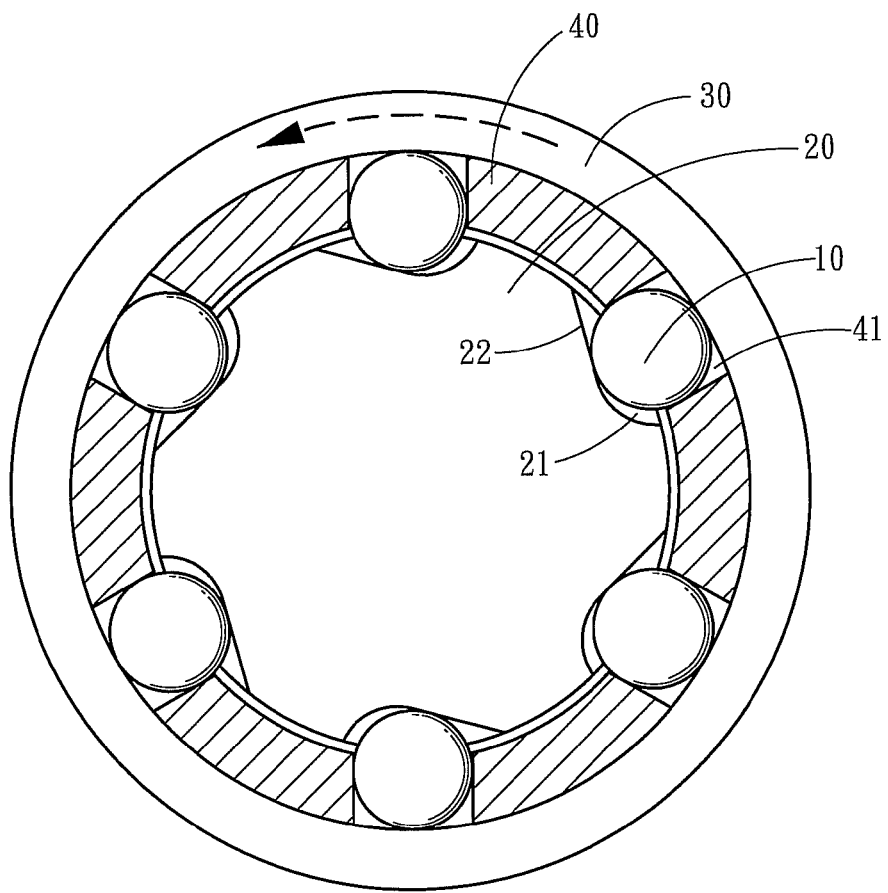
FIG. 8 is a schematic view of the one-way clutch of the invention in an operating condition.
Figure 9:
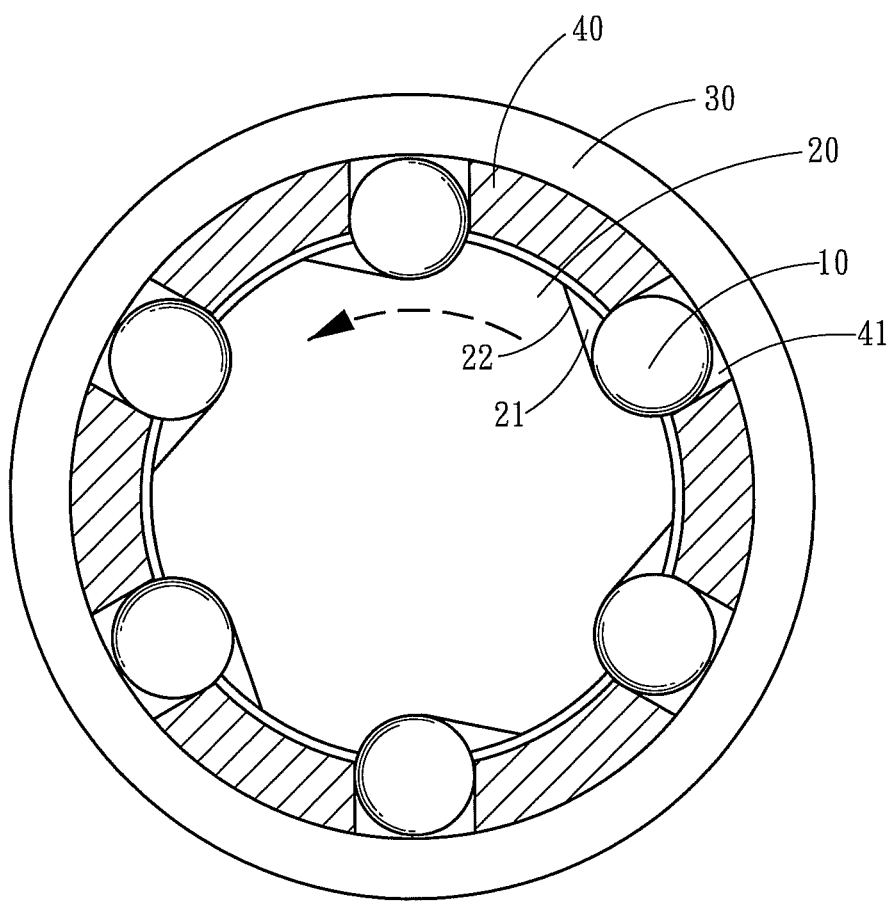
FIG. 9 is a schematic view of the one-way clutch of the invention in another operating condition.

Please refer to FIGS. 8 and 9 for the invention in operating conditions. First, the second collar 30 is driven to rotate relative to the first collar 20 towards the higher portions of the inclined bottom surfaces 22; the second collar 30 drives the circular holding frame 40 rotating via the friction force and pushes the rollers 10 to contact with the higher portions of the inclined bottom surfaces 22, thereby the rollers 10 are in contact with the first and second collars 20 and 30 at the same time to serve as transmission medium so that the second collar 30 can drive the first collar 20 rotating, i.e. the torsional force is transmitted from the second collar 30 to the first collar 20. In the event that the rotational speed of the first collar 20 is greater than that of the second collar 30, the rollers 10 enter the lower portions of the inclined bottom surfaces 22 and separate from the second collar 30, i.e. when the first collar 20 rotates at a speed faster than that of the second collar 30, the torsional force cannot be transmitted between the second and first collars 30 and 20.

When the rotational speed of the first collar 20 is greater than that of the second collar 30, the circular holding frame 40 also rotates with the first collar 20 to form a rotational speed difference with the second collar 30. Since the contact surface between the circular holding frame 40 and second collar 30 contains the abrasion-resistant material, the friction force can be reduced to avoid wearing of the contact surface.

As a conclusion, the invention does not require elastic elements, thus can provide more space to accommodate more rollers 10 to enhance the transmission torsional force, and also eliminate the trouble incurred by installing the elastic elements. As a result, production and assembly costs can be reduced. Moreover, the invention also provides a fabrication method to maintain a desired friction force between the circular holding frame 40 or 40A and the second collar 30 or 30A without precisely controlling the dimensions, hence can avoid dimensional difference caused by fabrication tolerance that might result in insufficient friction force between the circular holding frame 40 or 40A and the second collar 30 or 30A to cause inoperable problem.

What is claimed is:

1. A one-way clutch, comprising:
   a plurality of rollers;
   a first collar and a second collar that are concentric and rotate relative to each other, the first collar including a plurality of cavities at a number corresponding to the plurality of rollers, each of the plurality of cavities including an inclined bottom surface which includes a lower portion spaced from the second collar at a distance greater than a diameter of each of the plurality of rollers and a higher portion spaced from the second collar at a distance smaller than the diameter of the roller; and
   a circular holding frame which is located between the first collar and the second collar, and includes a support ring and a holding space formed within the support ring, the support ring including an annular carrying portion, a plurality of slots formed on the carrying portion and corresponding to the cavities to hold the rollers respectively, and an opening running through two sides of the carrying portion to provide the circular holding frame with flexibility, such that the circular holding frame tightly contacts with the second collar and is rotated with the second collar due to a friction force between them, wherein each of the plurality of slots having a width that is substantially the same as a diameter of a corresponding roller.

2. The one-way clutch of claim 1, wherein the circular holding frame and the second collar form a contact surface between them that include an abrasion-resistant material, 3. The one-way clutch of claim 2, wherein the circular holding frame is made of metal, the abrasion-resistant material being a coating layer selectively formed by polyaryletherketone (PAEK) or polytetrafluoroethylene (PTFE), the coating layer including at least one additive selected from the group consisting of graphite, molybdenum disulfide, PAEK, PTFE and combinations thereof.

4. The one-way clutch of claim 1, wherein the circular holding frame is made of plastics which include at least one additive selected from the group consisting of graphite, molybdenum disulfide, PAEK, PTFE and combinations thereof.

5. The one-way clutch of claim 1, wherein the first collar is coupled inside the second collar.

6. The one-way clutch of claim 5, wherein the circular holding frame is formed at an outer diameter slightly greater than an inner diameter of the second collar.

7. The one-way clutch of claim 1, wherein the first collar is coupled on an outer side of the second collar.

8. The one-way clutch of claim 7, wherein the circular holding frame is formed at an inner diameter slightly smaller than an outer diameter of the second collar.

9. The one-way clutch of claim 1 further including at least one set of roller bearing located between the first collar and the second collar.

* * * * *